(12) United States Patent
Begley et al.

(10) Patent No.: US 7,629,700 B2
(45) Date of Patent: Dec. 8, 2009

(54) MOTION INDUCED ELECTRICAL GENERATOR FOR CHARGING AND OPERATING DEVICES

(75) Inventors: Richard D. Begley, Huntington, WV (US); Anthony Szwilski, Lexington, KY (US); Donald W Osborne, Kieffer, WV (US); Frank Adkins, Williamsburg, WV (US)

(73) Assignee: Marshall University Research Corp., Huntington, WV (US)

( * ) Notice: Subject to any disclaimer, the term of this patent is extended or adjusted under 35 U.S.C. 154(b) by 11 days.

(21) Appl. No.: 11/867,889

(22) Filed: Oct. 5, 2007

(65) Prior Publication Data

US 2008/0084123 A1   Apr. 10, 2008

Related U.S. Application Data

(60) Provisional application No. 60/828,364, filed on Oct. 5, 2006.

(51) Int. Cl.
 *H02K 35/02* (2006.01)
 *F03B 13/00* (2006.01)

(52) U.S. Cl. .................................... 290/1 R
(58) Field of Classification Search ............... 290/1 R, 290/53
 See application file for complete search history.

(56) References Cited

U.S. PATENT DOCUMENTS

| | | | | |
|---|---|---|---|---|
| 1,864,499 A | * | 6/1932 | Grigsby | 74/130 |
| 3,129,347 A | | 4/1964 | Tognola | |
| 3,204,110 A | * | 8/1965 | Masuda | 290/42 |
| 3,252,018 A | | 5/1966 | Drautman | |
| 3,696,251 A | * | 10/1972 | Last et al. | 290/53 |
| 3,736,448 A | | 5/1973 | Hebel et al. | |
| 3,895,244 A | * | 7/1975 | Link | 310/15 |
| 3,968,387 A | | 7/1976 | Scarff | |
| 4,032,829 A | | 6/1977 | Schenavar | |
| 4,110,630 A | * | 8/1978 | Hendel | 290/53 |
| 4,260,901 A | * | 4/1981 | Woodbridge | 290/42 |
| 4,392,060 A | * | 7/1983 | Ivy | 290/53 |
| 4,423,334 A | * | 12/1983 | Jacobi et al. | 290/53 |
| 5,271,328 A | * | 12/1993 | Boulais et al. | 102/207 |
| 5,347,186 A | | 9/1994 | Konotchick | |
| 5,631,507 A | | 5/1997 | Bajric et al. | |
| 5,696,413 A | | 12/1997 | Woodbridge et al. | |
| 5,707,215 A | * | 1/1998 | Olney et al. | 417/233 |
| 5,818,132 A | * | 10/1998 | Konotchick | 310/17 |
| 5,941,692 A | * | 8/1999 | Olney et al. | 417/233 |

(Continued)

FOREIGN PATENT DOCUMENTS

JP    2004215472 A  *  7/2004

*Primary Examiner*—Joseph Waks
(74) *Attorney, Agent, or Firm*—Waters Law Group, PLLC; Robert R. Waters; Brian W. Foxworthy

(57) ABSTRACT

A motion induced generator is mounted to a vehicle or conveyance to harness the oscillatory motion generated during travel of the vehicle or conveyance, and may be coupled to at least one device or system, such as an external rail car lighting system, a global positioning device, a diagnostic device, or a combination thereof. Once the motion of the vehicle is harnessed and translated into usable and/or storable energy, the current or voltage is transmitted directly to the units for immediate consumption or for storage in a battery, capacitor, or a combination thereof.

19 Claims, 11 Drawing Sheets

U.S. PATENT DOCUMENTS

| | | |
|---|---|---|
| 6,700,248 B2 | 3/2004 | Long |
| 6,707,175 B2 | 3/2004 | Rigazzi |
| 6,729,744 B2 | 5/2004 | Mah |
| 6,791,205 B2 | 9/2004 | Woodbridge |
| 6,808,288 B2 | 10/2004 | Mah |
| 6,893,141 B2 | 5/2005 | Mah |
| 6,978,161 B2 * | 12/2005 | Tu et al. ..................... 455/573 |
| 6,994,450 B2 | 2/2006 | Mah |
| 7,105,939 B2 * | 9/2006 | Bednyak ...................... 290/42 |
| 7,205,677 B2 * | 4/2007 | Terzian et al. ................ 290/50 |

* cited by examiner

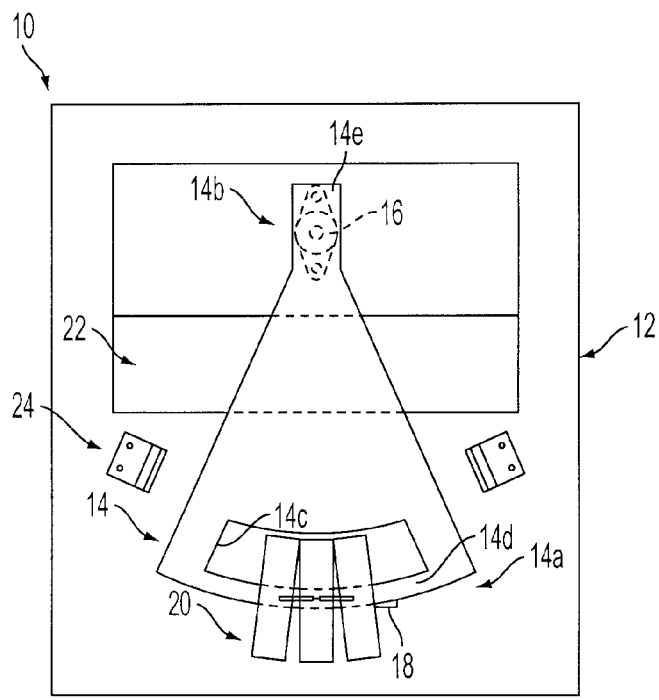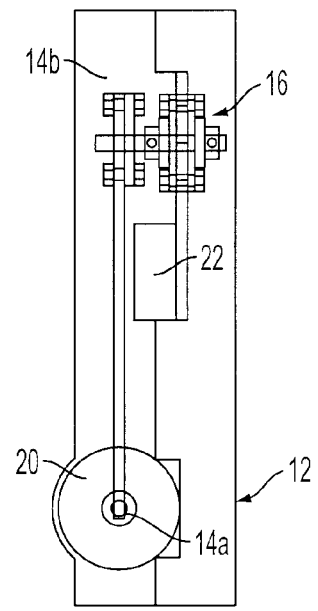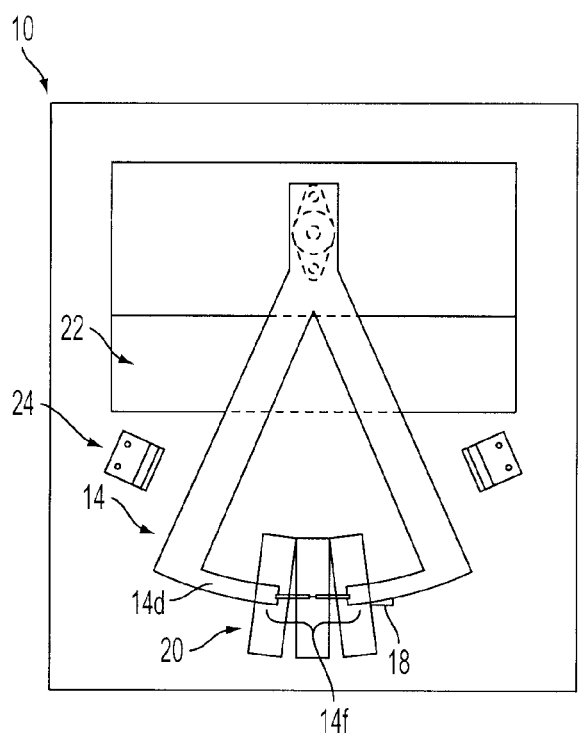
FIG. 4
FIG. 5
FIG. 6

MOTION INDUCED ELECTRICAL GENERATOR FOR CHARGING AND OPERATING DEVICES

CROSS REFERENCE TO RELATED APPLICATIONS

This application claims the benefit of U.S. Provisional Application No. 60/828,364, filed on Oct. 5, 2006.

STATEMENT REGARDING FEDERALLY SPONSORED RESEARCH OR DEVELOPMENT

The United States government has a paid-up license in this invention and the right in limited circumstances to require the patent owner to license others on reasonable terms as provided for by the terms of contract and regulations of the FRA Agency Award #DTFR53-05-6-00319.

FIELD OF INVENTION

This application discloses embodiments and claims generally related to a generator coupled to a vehicle or conveyance for converting or translating oscillatory motion of the vehicle or conveyance into useable and/or storable energy. More particularly, the generator is a unit coupled or mounted to the vehicle or conveyance that is further coupled to attendant devices requiring electrical power to operate, wherein the oscillatory motion of the vehicle or conveyance is converted or translated into voltage or current for immediate consumption or storage.

BACKGROUND

At present, the inventors are unaware of any commercial device, apparatus, or combination of devices and/or apparatuses, that may be coupled to a vehicle or conveyance to harness the oscillatory motion generated as a vehicle or conveyance travels along a route. The disclosure provided describes various embodiments utilized to harness said energy in keeping with the general principles of physics and with the principles involved in generating electricity from magnet and coil interaction, including size of the respective components, and the velocity at which a magnet travels through a coil (or conversely, a coil travels along a magnet). In particular, it is desirable that such a device or apparatus is available to harness otherwise wasted motion and energy, especially for supplying electrical energy to electronic devices, such as lighting systems, tracking devices, diagnostic equipment, other apparatuses, or combinations thereof. Such a device would reduce the need for the placement of batteries, and the monitoring and maintenance of the batteries during operation. Further, a specific need has been expressed for an electricity generating device utilizing such motion, wherein the device has a life span of at least several years, that the device is easily installed and has low maintenance, and that the physical dimensions of the device are such that the device does not interfere with normal operations and/or aesthetically unappealing. Thus, a need has been expressed, and as of yet, is unfilled by the present art. The present disclosure provides several embodiments for fulfilling such a need, describing a generator that converts or translate these various vehicle motions into usable or storable energy.

SUMMARY

In accordance with one embodiment of the general disclosure provided herein, a generator is mounted to a vehicle or conveyance to harness the oscillatory motion generated during travel of the vehicle or conveyance, and may be coupled to at least one device or system, such as an external rail car lighting system, a global positioning device, a diagnostic device, or a combination thereof. Once the motion of the vehicle is harnessed and translated into usable and/or storable energy, the current or voltage is transmitted directly to the units for immediate consumption or for storage in a battery, capacitor, or a combination thereof. As such, the present disclosure provides an explanation for a novel device providing a practical and economical commercial solution to the needs of at least one industry, and includes broader application to other forms of transportation and/or areas in which motion is generally unharnessed.

BRIEF DESCRIPTION OF THE DRAWINGS

FIG. 4 is a front view of one embodiment of the generator comprising an arm that swings or moves bi-directionally and urges the communication of magnet(s) and coils(s) to generate current or voltage;

FIG. 5 is a side view of FIG. 4;

FIG. 6 is a front view of an alternate embodiment of FIG. 4;

DETAILED DESCRIPTION OF THE EMBODIMENT(S)

The detailed description below is for several embodiments and is intended to provide an example or examples of some of the elements and features that are envisioned. It is to be understood that a variety of other arrangements, including combinations and sub-combinations of one or more individual embodiments, are also possible without materially departing from the description and claims as presented herein.

Figure 1:
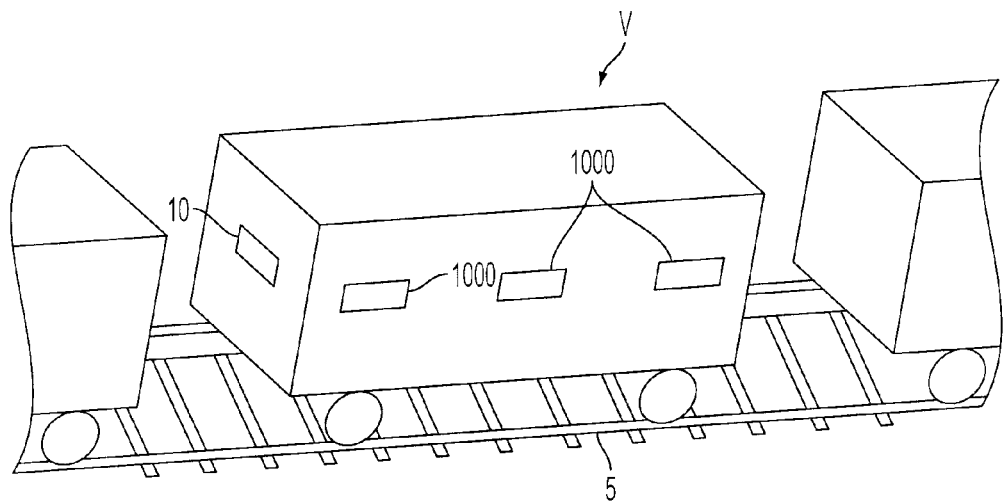
FIG. 1 is a perspective view of a vehicle, depicted as at least one rail car, having a generator mounted at the front or rear of the car, and further coupled with at least one device that consumes electricity.
Figure 2:
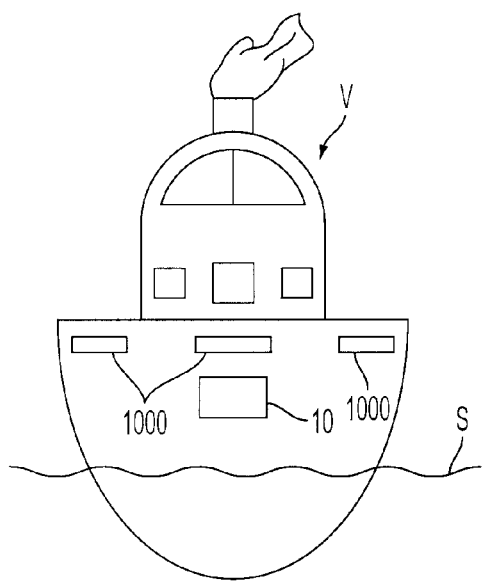
FIG. 2 is a front view of another vehicle or conveyance, depicted as a ship, having a generator mounted at the front or rear of the ship, and further coupled with at least one device that consumes electricity.
Figure 3:
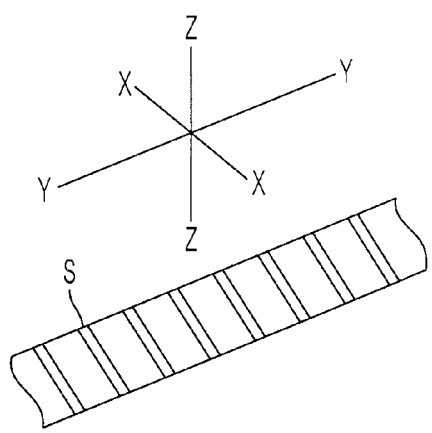
FIG. 3 is a perspective view of one surface, depicted as a railroad track, with the visual representation of the at least three forms of motion harnessed by the generator, especially along the X-X axis, the Y-Y axis and the Z-Z axis.

Referring now to FIG. 1 through FIG. 3, a generator 10 is envisioned as being coupled to or mounted upon a motor vehicle, a rail car or cars, ship or other form of conveyance, generally denoted as "V", so as to capture the motion of the vehicle along three axes X-X, Y-Y and Z-Z, respectively (hereinafter these types of motion are generally referred to as "oscillatory motion" and depicted in FIG. 3) as the vehicle travels along a path, and then convert or translate these motions into voltage or electrical current for use or storage. The voltage or electrical current may then be stored in a battery or capacitor, or transmitted for consumption by a device(s) 1000 coupled to the generator 10 unit. With reference to FIG. 3, the axes represent at least three general directions of motion considered for translation by the generator 10. Axis X-X represents a path or direction perpendicular to the to the direction of the surface "S" used by the vehicle "V". The motion generally associated with this axis is a side-to-side motion. Axis Y-Y represents a path or direction parallel to the direction of the surface "S". The motion generally associated with this axis is a forward-to-rear motion. Axis Z-Z represents a path or direction perpendicular to the plane of the surface "S". The motion generally associated with this axis is an up-and-down motion. Other directions, and thus, other axes may also come into consideration, especially variances between the three general axes described above.

It is envisioned that the device 1000 may include a variety of specific devices, and combination(s) of devices, including a global positioning device 1002, a combination positioning device and tracking system 1004, a diagnostic device 1006, a light emitting device 1008 and several other attendant devices that may be coupled to the generator 10 to receive the converted voltage or electrical current. The light emitting device 1008 may have different lighting elements, including incandescent bulbs, light emitting ceramic devices, light emitting diodes, a liquid crystal display, fluorescent bulbs, and other similar light emitting elements. It is further envisioned that the device(s) 1000 maybe coupled to any of the general embodiments disclosed below, thereby utilizing the energy converted from the oscillatory motion of the vehicle(s).

Referring now to the figures, the generator 10 comprises an enclosure 12 that houses components of the generator 10. The enclosure 12 may include an arm 14 housed and/or coupled within the enclosure 12. The arm 14 may be housed within the enclosure in a manner that permits free movement of the arm 14 in response to motion, and further in response to solids or fluids within the enclosure 12 influencing the movement of the arm 14 (see FIG. 14 through FIG. 20 and General Embodiments E through H). It is envisioned that the arm 14 may comprise a variety of embodiments, including but not limited to the descriptions subsequently described. The arm 14 may be coupled within the enclosure 12 via means 16, such as a hinge, bearing, spring or other suitable object, that permits the coupled swing arm 14 to move and/or swing with bi-directional motion. The arm 14 is configured and oriented so that at least one magnet 18 or at least one coil 20 is positioned at one end 14a of the arm 14, or so that the arm 14 urges at least one magnet 18 and at least one coil 20 to communicate with one another in response to the motion of the vehicle. In the embodiments relative to FIG. 4 through FIG. 8 and FIG. 10 through FIG. 13, means 16 is positioned opposite to the one end 14a, such as at an opposing end 14b or subjacent to and positioned along an imaginary line or axis (A-A) extending from the opposing end 14b. At least one magnet 18 or at least one coil 20 is positioned so as to pass through at least one coil 20 or at least one magnet 18, respectively, thereby allowing the magnet 18 and the coil 20 to communicate and generate a voltage or current that may be directed to a diode, a capacitor, a battery or for supplying a specific device that uses electrical current and power. Thus, if at least one magnet 18 is positioned on the arm 14, then a corresponding coil or coils 20 is/are positioned in a manner for the magnet 18 to pass through. Conversely, if at least one coil 20 is positioned on the arm 14, then a corresponding magnet or magnets 18 is/are positioned in a manner for the coil(s) 20 to envelope as the arm 14 moves or swings.

It is envisioned that a variety of magnet types and sizes may be used in combination with a variety of coil types and sizes, with the expectation that the relative sizes of the magnets and the coils are such that the communication between magnet and coil is easily facilitated and maximizes the voltage or current generated thereby. For instance, it is envisioned that the magnets may be superior strength pressure formed ring magnets, superior strength rare earth magnets (encased in a tube), or other similarly formed magnets. It is also envisioned that the coils may be of variations of NEMA MW wire coils from 2,000+ turns, 5100+ turns, 8000+ turns, or variations above and beyond the range given. For instance, it has been observed that 2000+ turn NEMA MW 28 max-C AWG wire coils was used, 5100+ turn NEMA MW wire coil was used, and 8000+ turn NEMA MW 30 max-C AWG wire coil was used. However, the generator 10 is not limited to these particular specifications, as all suitable specifications are contemplated for use within the enclosure described below for generating a voltage or current of sufficient strength for consumption or storage.

The enclosure 12 may have a variety of forms or shapes, including the box-like structure depicted in FIG. 1 through FIG. 10, respectively. Other forms or shapes contemplated include a disc or a triangle, among others. The enclosure 12 may include a compartment 22 housing the electrical components necessary for translating the oscillatory motion of the vehicle and transmitting the resulting voltage or current into storable and/or usable energy for work. The coils 20 are coupled in parallel to a rectifying circuit, which generally includes the electrical coupling of the coils to a diode, which then converts the alternating current generated by the magnet and coil interaction into direct current. The diode is electrically coupled to a capacitor, which is electrically coupled to a battery. The direct current is transmitted through the electrical coupling to the capacitor and the battery for storage. The enclosure 12 may also include at least one arm stop 24 (two arm stops are depicted in the figures) to inhibit the arm 14 from moving beyond a defined parameter or path, and in particular, to inhibit the magnet(s) 18 from moving out of communication with the coil(s) 20. Another alternative for inhibiting the arm 14 movement includes the placement of a spring 26 at means 16. It is also envisioned that the arm stop(s) 24 and a spring 26 may be utilized as a combination to inhibit such excessive path movement of the arm 14.

The arm 14 may assume a variety of forms or shapes and operate in several ways to effectively moving the magnet(s) 18 through the coil(s) 20 to generate voltage or current. In general, and applicable to the present embodiments envisioned and disclosed below, the arm 14 comprises an end 14*a* and an opposing end 14*b*. End 14*a* is adjacent to the positioning of the magnet(s) 18 and the coil(s) 20. End 14*b* is adjacent the positioning of means 16 (hinge, bearing, spring or other device) so as to provide the arm 14 a point of reference for swinging or pivoting. It is envisioned that the orientation of the arm 14 may be varied, and in particular, is depicted in the figures with end 14*a* vertically inferior (or subjacent) to end 14*b* so that end 14*b* assumes the vertically superior (uppermost) position within the enclosure 12, with end 14*b* functioning as a pivot point about which the arm 14 may move in a pendulum-type motion.

It is envisioned that each vehicle may have at least one generator 10 unit, with each generator 10 unit optionally coupled to an attendant device(s) 1000. Thus, as the vehicle generates oscillatory motion, the arm 14 within a particular generator 10 unit may move or swing in response thereto. It is envisioned that the oscillatory motion of the vehicle will cause the swing arm 14 to move in a bi-directional and/or linear (or approximately linear) motion so that magnet(s) 18 and coil(s) 20 engage and communicate, thereby generating voltage or electrical current for immediate consumption or storage.

General Embodiment A

In one embodiment, depicted in FIG. 4, the arm 14 is predominantly uniform and has a wedge-like shape (if looking at the arm 14 from the front or rear). At end 14*b*, the arm 14 may have a segment 14*e* having an aperture or hole through which the arm 14 may be coupled to the enclosure 12 or an element within the enclosure 12. Adjacent to the end 14*a*, a slot 14*c* is formed in the arm 14 to accommodate the radius of the coil(s) 20 as the arm 14 moves the magnet(s) 18 through the coil(s) 20 (or conversely, moving the coil(s) 20 passed the magnet(s) 18). Disposed between the end 14*a* and the slot 14*c* is a portion or section 14*d* integral to the arm 14, the portion or section 14*d* supporting the magnet(s) 18 that are placed thereon. The magnet(s) 18 is/are positioned on the portion or section 14*d* so that balance is achieved relative to the arm 14. It is envisioned that portion or section 14*d* may be a continuous element traversing the margins of the arm 14 (as depicted in FIG. 4). It is also envisioned that portion or section 14*d* may have a space or void 14*f* formed between the portions or sections 14*d*, with the magnet(s) 18 or coil(s) 20 positioned at the ends of the respective portion(s) or section(s) 14*d* (see FIG. 6 for one example).

In another embodiment, and as depicted in FIG. 6, the arm 14 has an inverted V-shape (or, to state another way, an A-shape without the horizontal line or brace that is inherent in an "A") such that the point of the "V" approximates the position of means 16 (hinge, bearing and/or spring), which may correspond to end 14*b* and which may have a segment 14*e* having an aperture or hole through which the arm 14 may be coupled to the enclosure 12. The inward facing serifs of the "V" approximate the position and formation of the portion or section 14*d* that support the magnet(s) 18 thereon. The magnet(s) 18 is/are positioned on the portion or section 14*d* so that balance is achieved relative to the arm 14. It is envisioned that portion or section 14*d* may be a continuous element traversing the margins of the arm 14 (as depicted in FIG. 4). It is also envisioned that portion or section 14*d* may have a space or void 14*f* formed between the portions or sections 14*d*, with the magnet(s) 18 positioned at the ends of the respective portion(s) or section(s) 14*d* (see FIG. 6). In this embodiment, the slot 14*c* (described above) is not necessary, as the swing arm 14 includes space between the arm 14 margins through which the radius of the coil(s) 20 may pass unimpeded.

Figure 7:
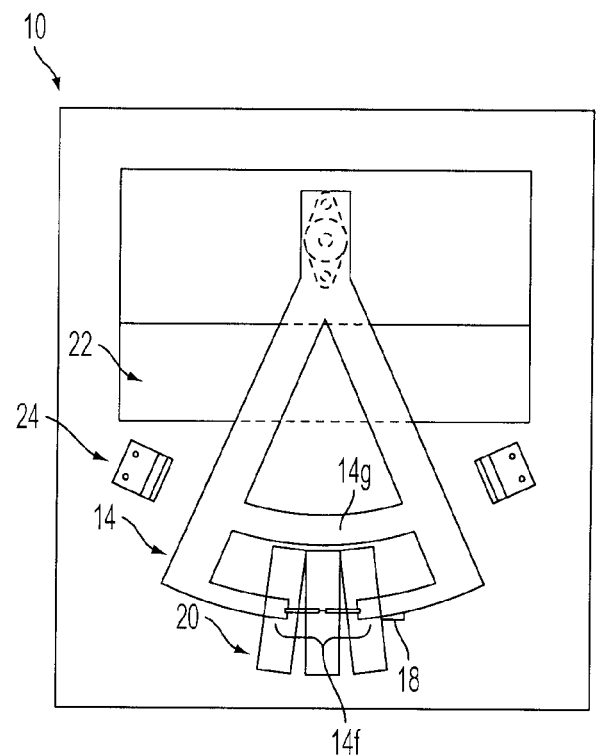
FIG. 7 is a front view of an alternate embodiment of FIG. 4 and FIG. 6.
Figure 8:
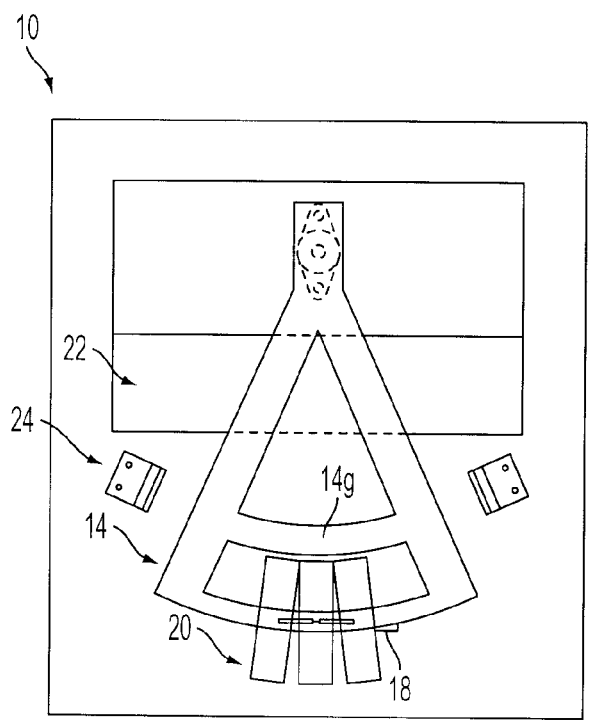
FIG. 8 is a front view of an alternate embodiment of FIG. 4, FIG. 6 and FIG. 7.

In another embodiment, and as depicted in FIG. 7 and FIG. 8, the arm 14 has an A-shape such that the point of the "A" approximates the position of means 16 (hinge, bearing and/or spring), which may correspond to end 14*b* and which may have a segment 14*e* having an aperture or hole through which the arm 14 may be coupled to the enclosure 12. The inward facing serifs of the "A" approximate the position and formation of the portion or section 14*d* that support the magnet(s) 18 thereon. The magnet(s) 18 is/are positioned on the portion or section 14*d* so that balance is achieved relative to the arm 14. A horizontal brace 14*g* of the A-shaped arm 14 provides additional stability, rigidity and durability to the arm 14. It is envisioned that portion or section 14*d* may be a continuous element traversing the margins of the arm 14 (as depicted in FIG. 8). It is also envisioned that portion or section 14*d* may have a space or void 14*f* formed between the portions or sections 14*d*, with the magnet(s) 18 positioned at the ends of the respective portion(s) or section(s) 14*d* (see FIG. 7). In this embodiment, the slot 14*c* (described above) is not necessary, as the arm 14 includes the space between the arm 14 margins through which the radius of the coil(s) 20 may pass unimpeded.

Figure 9:
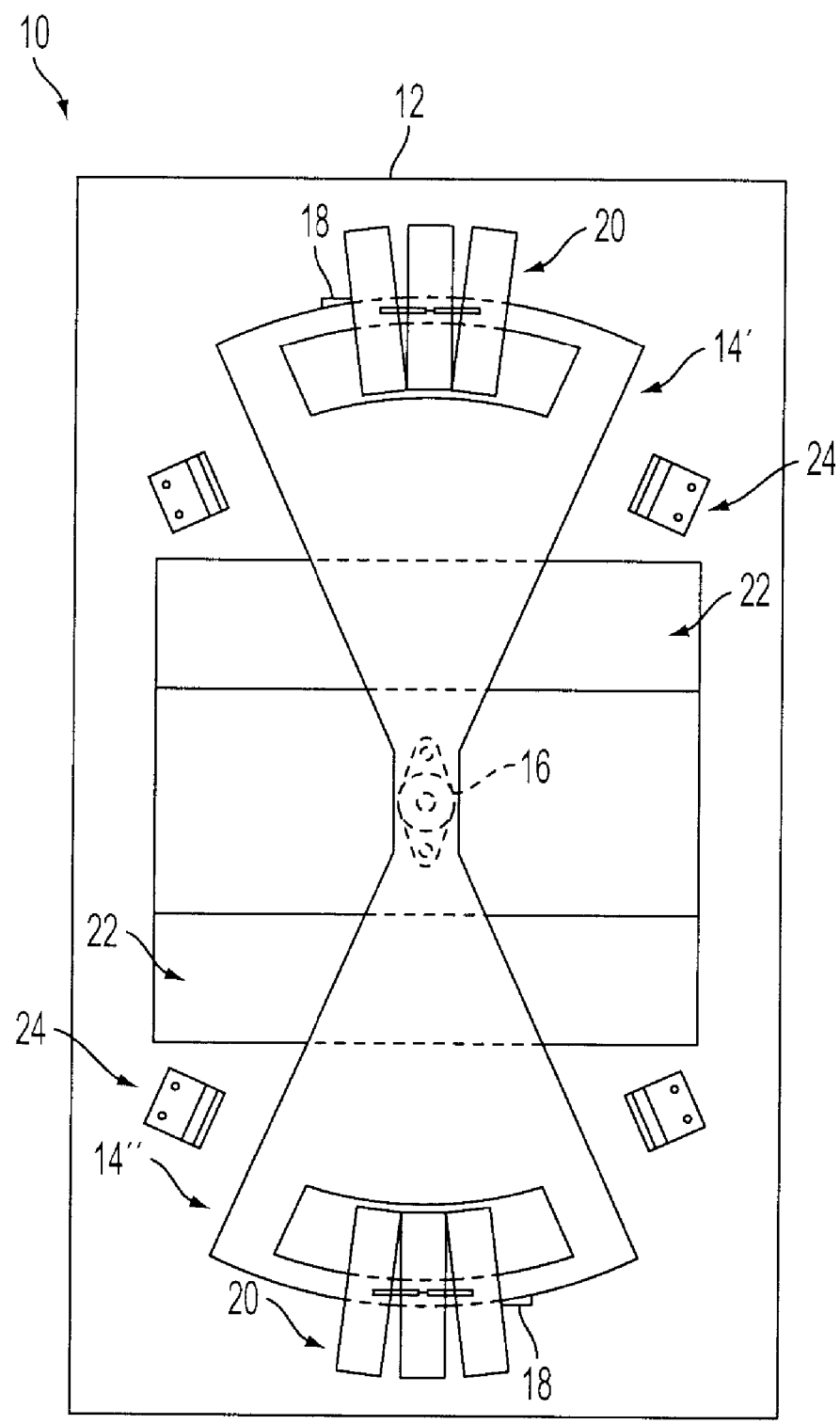
FIG. 9 is a front view of an alternate embodiment of FIG. 4, FIG. 6, FIG. 7 and FIG. 8, in which the generator has two arms arranged at approximately 180 degrees from one another, and being a mirror image thereof.

In another embodiment, and referring now to FIG. 9, the generator 10 may comprise at least two arms 14' and 14" aligned approximately 180 degrees. It is envisioned that the two arms 14' and 14" are mirror images of one another, although it is also envisioned that the two arms 14' and 14" may be a combination of one embodiment described above with a different embodiment also described above (including the mix of a wedge-like shape with an A-shape or V-shape and all the combinations possible from these embodiments). The arms 14' and 14" would share means 16 (hinge, bearing, other), with each arm 14' and 14" moving in complementary motion to the other. In other words, as one of the arms 14' or 14" moved in response to the oscillatory motion of the vehicle, then the other arm 14' or 14" would move in the opposite direction, and thus, the arms 14' and 14" would maintain an approximate 180 degree separation.

It is envisioned that the use of a wedge-like shape, an A-shape, or a V-shape, or combinations of the various forms, which may be generally described as an arm having a triangular perimeter, provides balance and stability to the arm, and aids the inhibition of excessive movement outside of the bi-directional motion desired.

It is envisioned that a number of materials may be used in the construction of the arm(s) 14, or 14' and 14", respectively, including the use of metal, plastics, and other suitable material. It is appreciated that the use of certain metals would alter the characteristics of the magnetic field and voltage or current induced by the communication of the magnet(s) 18 and coil(s) 20, and the choice of metals for construction would be decided accordingly. In one embodiment, it is envisioned that the arm(s) 14, or 14' and 14", respectively, may be formed of a high impact polycarbonate material so as to lessen the weight of the generator apparatus in general, to reduce the costs of manufacture in both material costs and in time devoted to manufacturing the arm(s) 14, or 14' and 14", respectively, and to reduce or eliminate the potential for interference between the material used in the arm(s) 14, or 14' and 14", respectively, and the magnetic field(s) induced relative to magnet(s) 18 and coil(s) 20.

Means 16 may have a variety of forms or shapes and may include a number of apparatuses or devices that accomplish similar objects, including the ability to swing an element about a point. In one embodiment, means 16 may include a hinge or hinges 16a that are inserted through the aperture or hole formed in segment 14e of the arm 14 (or arms 14' and 14"). The hinge may couple the arm 14 (or arms 14' and 14") to an element within the enclosure 12 or to the enclosure 12 in particular. Likewise, means 16 may include a bearing or bearings 16b utilized to achieve a free swing or bi-directional motion. For instance, and as an example of one envisioned embodiment depicted in FIG. 5, means 16 is a free ball flange bearing of a high grade and of a quality and type that is considered maintenance free. A metal shaft is intermediately disposed between the bearings and the aperture formed in segment 14e of the arm 14. As the arm 14 moves bi-directionally in response to the oscillatory movement of the vehicle, the shaft may move with the arm 14 or may be stationary and allow the arm 14 to move about the shaft. It is also envisioned that a spring(s) may be used in place of a hinge(s) or bearing(s), such that the spring(s) would have a torque about its length for returning the arm 14 back toward a normal position when the oscillatory motion of the vehicle is not urging the arm 14 directly. It is envisioned that other similar apparatuses or devices may be substituted to achieve similar results.

It is also envisioned that the enclosure 12 may include at least one stop 24. The stop(s) 24 inhibits the arm 14 from moving beyond a defined parameter, and in particular, to inhibit the magnet(s) 18 from moving out of communication with the coil(s) 20. As depicted in FIG. 4, the stop(s) 24 is an element that projects from within the enclosure 12, and may project from the enclosure 12 or from an element within the enclosure 12. The stop(s) 24 may assume many forms or shapes, and may be constructed from a variety of materials. In particular, the stop(s) 24 may assume the form of a post or other similar configuration sufficient to inhibit the motion of the arm 14. It is further envisioned that the stop(s) 24 may include a cushion or pad coupled to the surface facing and adjacent to the margin(s) of the arm 14 (or arms 14' and 14" if applicable).

In particular, and as depicted in FIG. 4, the generator 10 comprises an enclosure 12 having a arm 14 positioned therein. The arm 14 is a integral unit having a wedge-like shape or form. The arm 14 is coupled to or within the enclosure 12 via means 16, depicted as a free ball flange bearing and a shaft coupled therewith and communicating with the end 14b and through segment 14e. At the opposing end 14a, a slot 14c is formed to accommodate the radius of the coil(s) 20 as the magnet(s) 18 are move through the center of the coil(s) 20. Subjacent to the slot 14c is the portion or section 14d that supports the magnet(s) 18 thereon. The coil(s) 20 is/are mounted to or within the enclosure and oriented so that the central opening within the coil(s) 20 is/are concentric about an imaginary horizontal axis (B-B). The enclosure 12 includes a compartment 22 for housing the electronic components associated with the generator 10. The electronic components are operatively coupled to a diode, a capacitor, a battery and/or directly to an apparatus or device for use in utilizing the voltage or current generated by the magnet(s) 18 and coil(s) 20 as the magnet(s) 18 and coil(s) 20 communicate with one another. The enclosure 12 also includes a pair of stops 24 for inhibiting the range of swing and bi-directional motion of the arm 14. Each stop 24 is positioned outwardly adjacent the respective outward margins of the arm 14 (and for reference, the margins are referenced as 14m).

General Embodiment B

Figure 10:
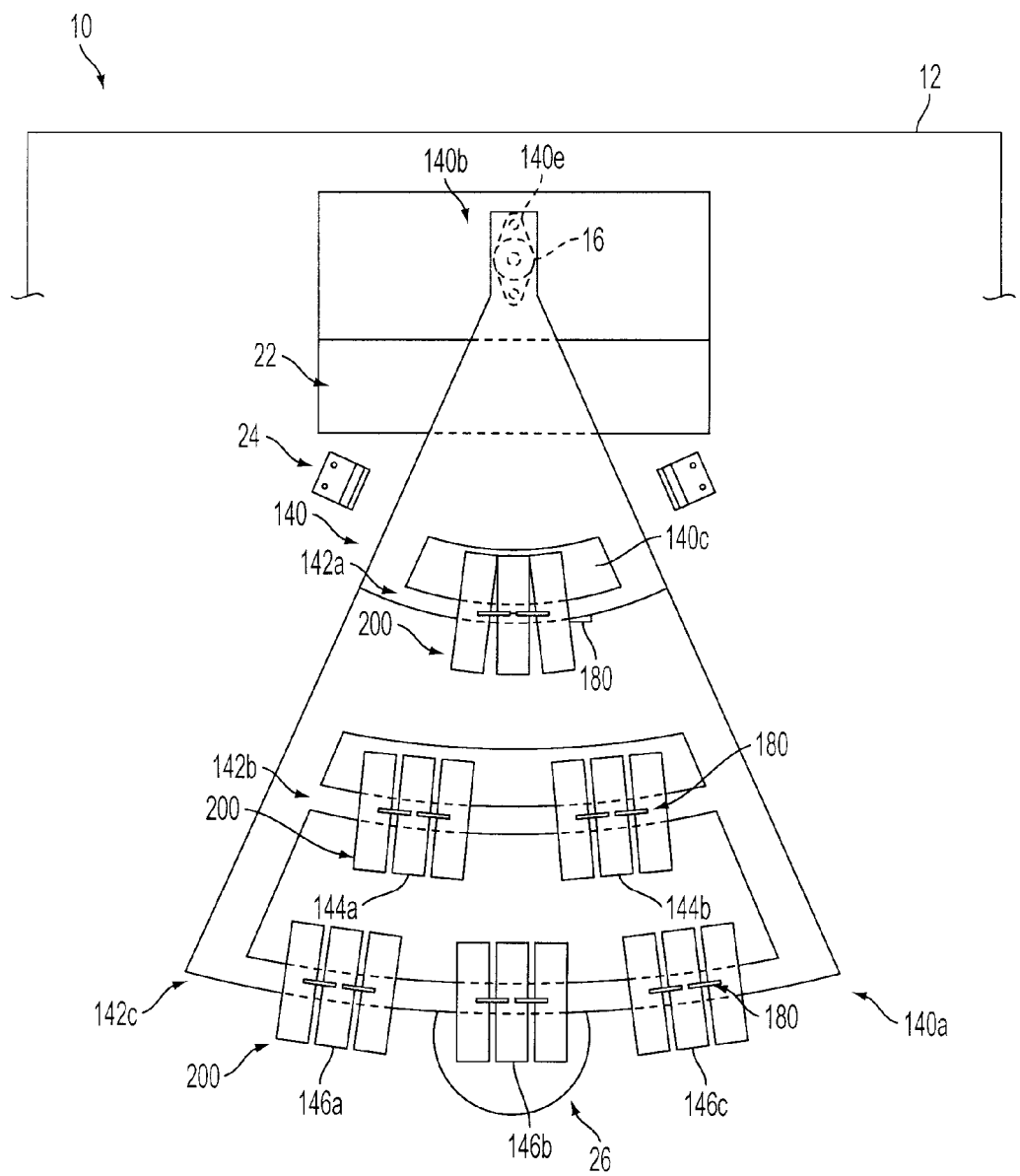
FIG. 10 is a front view of an alternate embodiment of FIG. 4, FIG. 6, FIG. 7, FIG. 8 and FIG. 9, in which the generator has multiple rows of magnets and/or coils.

Related to General Embodiment A and the disclosure regarding the arm 14 having a wedge-like form, and referring now to FIG. 10, a generator 10 having an elongated or extended swing arm 140 is disclosed in accordance with another embodiment of the present invention. The generator 10 has an enclosure 12 having the same elements, structures and alternatives as described above in General Embodiment A, thereby incorporating by reference the description of General Embodiment A as to the pertinent and applicable elements and structures required by General Embodiment B, but utilizing an alternative arm 140 having multiple rows of magnets 180 and coils 200 utilized for the generation of voltage or current.

Thus, the arm 140 is predominantly uniform and has a wedge-like shape with opposing ends 140a and 140b. At end 140b, the arm 140 may have a segment 140e having an aperture or hole through which the arm 140 may be coupled to the enclosure 12 via means 16. Adjacent to the end 140a, an slot 140c is formed in the arm 140 to accommodate the radius of the coil(s) 200 as the arm 140 moves the magnet(s) 180 through the coil(s) 200 (or conversely, moving the coil(s) 200 passed the magnet(s) 180). Disposed between the end 140a and the slot 140c is a portion or section 140d integral to the arm 140, the portion or section 140d supporting the magnet(s) 180 placed thereon. The magnet(s) 180 is/are positioned on the portion or section 140d so that balance is achieved relative to the arm 140. It is envisioned that portion or section 140d may be a continuous element traversing the margins (140m) of the arm 140 (as depicted in FIG. 7). It is also envisioned that portion or section 140d may have a space or void 140f formed between the portions or sections 140d, with the magnet(s) 180 or the coil(s) 200 positioned at the ends of the respective portion(s) or section(s) 140d. It is also envisioned that the present embodiment may include at least one or multiple stops 24 for use in controlling the range of bi-directional motion of the arm 140, as explained above in General Embodiment A. It is also envisioned that the arm 140 may include a ballast weight 26 at the end 140a, in which the ballast weight 26 is used for storing and releasing energy to perpetuate the pendulum motion.

In this embodiment, the arm 140 has an extended length to accommodate the plurality of rows 142, which for simplicity has been limited to three rows 142a, 142b and 143c, respectively, of magnets 180 and coils 200. It is envisioned that each row may have at least one magnet 180 and at least one coil 200, and as described previously, the magnet(s) 180 or the coil(s) 200 may be placed on the portion or section 140d of the swing arm and thus corresponding to the magnet(s) 180 or coil(s) 200 mounted within the enclosure 12. As depicted in FIG. 7, each row 142a, 142b and 142c has at least one magnet 180 mounted to and supported by the portion or section 140d of the arm 140. And, corresponding to each row and the magnet(s) 180 mounted within that row, at least one coil 200 is mounted within the enclosure 12 to correspond with the magnet(s) 180.

More particularly, each row 142a, 142b and 142c has an increasing number of magnets 180 and coils 200. As depicted, the first row 142a is configured so that two magnets 180 are mounted on the portion or section 140d and so that three coils 200 are mounted within the enclosure 12. The second row 142b is configured so that there are two sets 144a and 144b of magnets 180 and coils 200, and particularly configured so that one set 144a includes two magnets 180 and three coils 200 and an adjacently spaced set 144b also having two magnets 180 and three coils 200. The third row 142c is configured so that there are three sets 146a, 146b and 146c of magnets 180 and coils 200, and particularly configured so that there is one set each 146a and 146c adjacent the respective margins (140m) of the arm 140 having two magnets 180 and three coils 200, and a set 146b of magnets 180 and coils 200 intermediately disposed between the outward sets 146a and 146c, with the intermediate set 146 also having two magnets 180 and three coils 200. However, the embodiment is not limited to the configuration described, as a single magnet or multiple magnets may be utilized, as well as a single coil or multiple coils may be utilized, and the various combinations that may be generated therefrom.

It is further envisioned that the variations described above in relation to General Embodiment A, including the use of inverted V-shaped and A-shaped swing arms, and further including the utilization of multiple arms 14' and 14", is equally applicable to the present embodiment.

General Embodiment C

Figure 13:
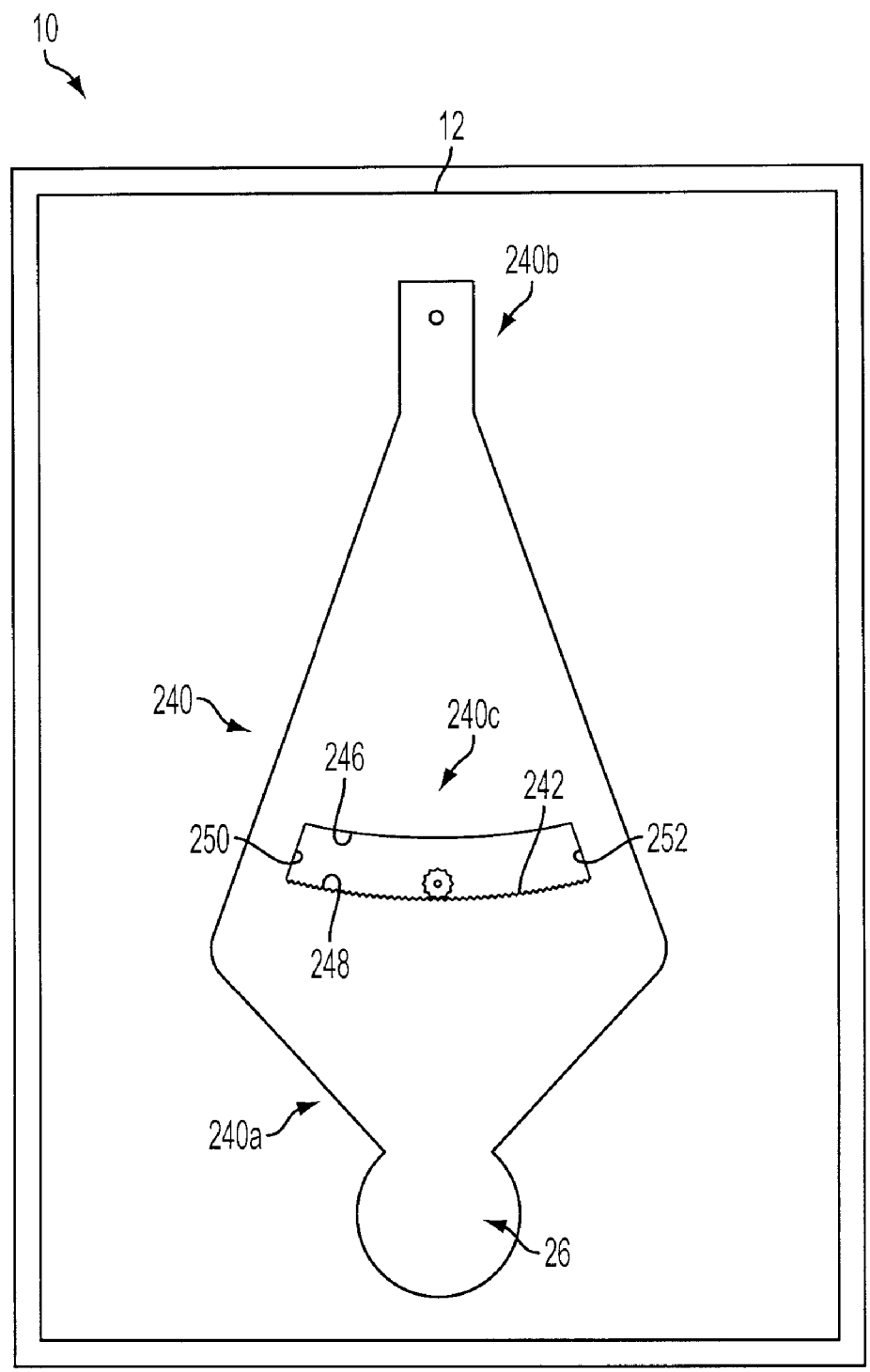
FIG. 13 is a front view of an alternate embodiment of FIG. 4, FIG. 6, FIG. 7, FIG. 8, FIG. 9, FIG. 10 and FIG. 11.

Referring now to FIG. 13, the generator 10 having another type of arm 240 is disclosed in accordance with another embodiment of the present invention. The generator 10 has an enclosure 12 having the same elements, structures and alternatives as described above in General Embodiment A and General Embodiment B, thereby incorporating by reference the description of General Embodiment A and General Embodiment B as to the pertinent and applicable elements and structures required by General Embodiment C, but utilizing an alternative arm 240 having a slot 240c with teeth 242 operatively coupled and mechanically communicating with at least one gear 244 having complementary teeth 246 for the generation of voltage or current.

Thus, the arm 240 is predominantly uniform and has a wedge-like shape with opposing ends 240a and 240b. At end 240b, the arm 240 may have a segment 240e having an aperture or hole through which the arm 240 may be coupled to the enclosure 12 via means 16. Adjacent to the end 240a, a ballast weight 26 is formed.

Intermediately disposed between ends 240a and 240b, a slot 240c is formed. The slot 240c has at least one set of teeth 242 formed along one of the long surfaces 246 or 248 (for reference, the short surfaces are referred to by reference numerals 250 and 252) of the slot 240c. The teeth 242 engage and mechanically communicate with the teeth 246 of at least one gear 244. The gear 244 is coupled to a gear shaft 254 that is rotated in response to the movement of the gear 244 as urged by the movement of the slot 240c and the corresponding teeth 242 thereon. The gear shaft 254 is coupled to a plurality of arms 256 aligned substantially perpendicular to the axis of rotation of the gear shaft 254. The arms 256 have magnets 258 coupled thereto, thus as the gear shaft 254 rotates, the arms 256 rotate in the same direction and pass by or through to generate voltage or current that is then transmitted via the electronic components. In essence, the gear 244 and gear shaft 254 were components of a rotary generator coupled to the overall structure.

General Embodiment D

Figure 11:
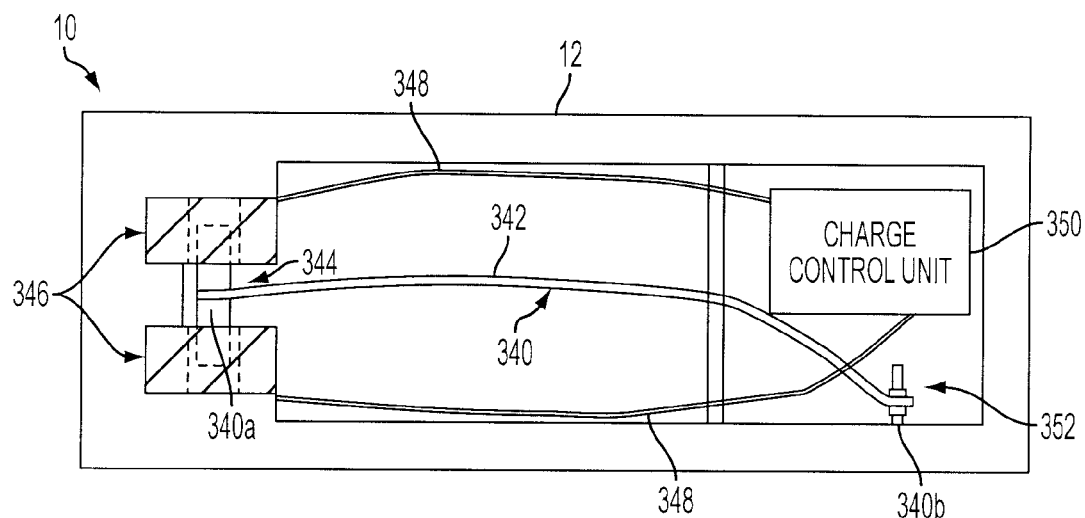
FIG. 11 is a front view of an alternate embodiment of FIG. 4, FIG. 6, FIG. 7, FIG. 8, FIG. 9 and FIG. 10, in which the generator has a spring arm.
Figure 12:
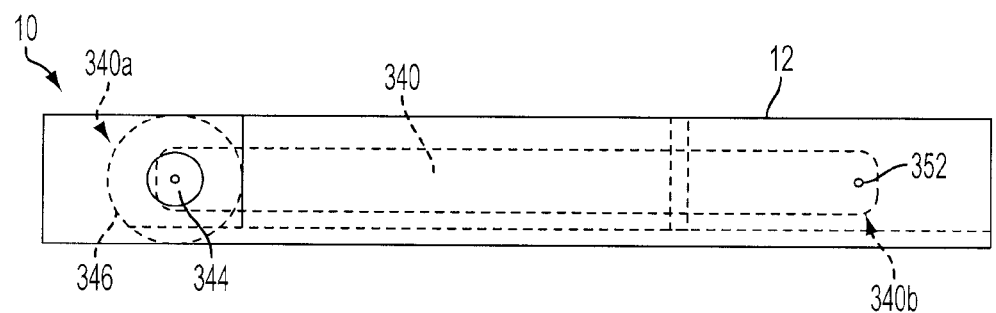
FIG. 12 is a side view of FIG. 11.

Referring now to FIG. 11 and FIG. 12, a generator 10 having alternate internal components is disclosed in accordance with another embodiment of the present invention. The generator 10 has an enclosure 12 having an arm 340 having a free end 340a and a fixed end 340b opposite to the free end 340a. The arm 340 comprises a flat spring material 342 secured within the enclosure 12 at the fixed end 340b, and having a magnet 344 coupled to a free end 340a thereof. The magnet 344 passes through at least one coil 346 (and depicted as two coils 346 in FIG. 12) in response to the oscillatory movement of a vehicle, thus generating a voltage or current. The generated voltage or current is carried on at least one lead wire 348 (and depicted as two lead wires 348 operatively coupled to the two coils 346 depicted in FIG. 12). The lead wire(s) 348 is/are operatively coupled to a charge control unit 350 that may be housed within or without the enclosure 12, and which is further operatively coupled to a diode, a capacitor, a battery and/or a device that may require voltage or current for power.

It is envisioned that the flat spring material 342 may be formed from a variety of construction material, including metal, plastic or other suitable materials, and/or a combination of materials. In one such embodiment, the flat spring material 342 may be metal, preferably of the type that will not interfere with the magnetic field(s) of the coil(s) 346 and the voltage or current generated by the interaction of the magnet(s) 344 and coil(s) 346. In another embodiment, the flat spring material 342 may be formed of polycarbonate or another non-interfering material. In another embodiment, the flat spring material 342 may be formed of metal up to a location adjacent the magnet 344, with the remainder of the flat spring material 342 comprising a non-interfering material, such as the polycarbonate described previously.

It is envisioned that the fixed end 340b of arm 340 is coupled and secured within the enclosure 12 via the use of an adjustable tensioning screw 352 or another suitable substitute. The use of an adjustable tensioning screw 352, or other similar device, allows the arm 340 to be finely tuned and adjusted to capture the optimal oscillatory motion or movement generated by the vehicle.

General Embodiment E

Figure 14:
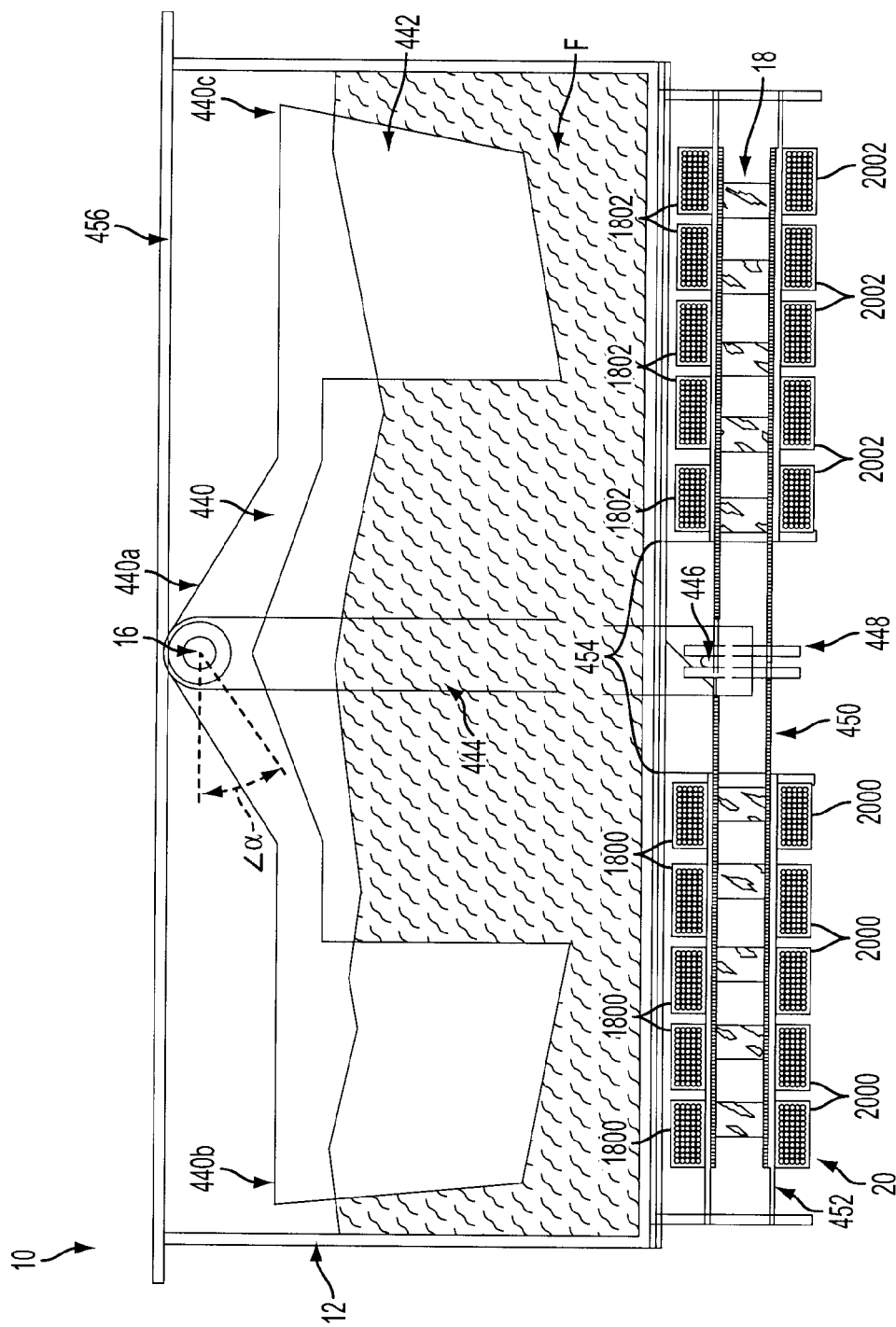
FIG. 14 is a front view of a generator embodiment utilizing fluid as a means for effecting motion of a magnet(s) and coil(s), and having an arm with floats, the arm coupled with a connecting rod that urges the movement of the magnet(s) through the coil(s)

Referring now to FIG. 14, a generator 10 having an alternate configuration is disclosed in accordance with another embodiment of the disclosure provided herein. In this embodiment, and subsequent embodiments F through H, fluid is used as a medium for effecting movement of a magnet(s) 18 through a coil(s) 20, utilizing an arm 440 and floats 442 within the enclosure 12. The generator 10 has an enclosure 12 comprising an arm 440 having floats 442 depending at opposite ends thereof. The enclosure 12 is envisioned as having a removable lid 456 for sealing the contents of the enclosure 12 therein and protecting the contents from external environmental elements. The arm 440 comprises an intermediate portion 440a coupled to a connecting rod 444, the arm 440 and rod 444 mutually coupled via means 16. The rod 444 comprises a slip pin 446 at an end opposite the end coupled with the arm 440 at means 16. The slip pin 446 communicates with a pair of discs 448. The discs 448 are formed intermediate to the ends of a tube 450 on both sides of the slip pin 446. The tube 450 houses a plurality of magnets 18 that engage and communicate with a plurality of wire coils 20. The coils 20 are arranged or oriented along a linear path, with an elongated opening or bore 452 to accommodate the tube 450 and the magnets 18 therein. A space or void 454 is formed and defined between the magnets 18 and coils 20 respectively utilized along the linear path depicted. In one embodiment, the space or void 454 is intermediate to a first set of magnets 1800 and a second set of magnets 1802, all housed within the tube 450, and a first set of coils 2000 and a second set of coils 2002. The first set of magnets 1800 and the first set of coils 2000 communicating with one another, and the second set of magnets 1802 and the second set of coils 2002 communicating with one another, respectively.

The arm 440 comprises opposing ends 440b and 440c having separate floats 442 depending therefrom. The intermediate portion 440a forms the apex of the arm 440 as the ends 440b and 440c are angularly offset at an angle $\angle\alpha$. The floats 442 are depicted as partially submerged within a fluid "F", with the floats 442 moving in response to the motion imparted on the fluid "F" from the motion of the vehicle. It is envisioned that the floats 442 may be utilized in a various orientations relative to the fluid "F", including substantially submerged, partially submerged, or minimally submerged. In contrast to the substantially or partially submerged orientation(s), a minimally submerged orientation is one in which the floats 442 would substantially float (with some submersion expected) on the surface of the fluid "F" as a result of the floats 442 having less density than the fluid "F". The floats 442 may be fabricated from a variety of materials, including metals, plastics, cork or other similar material that is generally less dense than the fluid "F" provided. It is envisioned that the fluid "F" will predominantly comprise water, although additives may be included within the fluid "F" for a variety of operational and maintenance purposes.

As the fluid "F" moves in response to the motion of the vehicle, the floats 442 are urged into a rocking motion that urges the rod 444 into a pendulum type motion. In such a sequence, as the float 442 at one end (440b for instance) of the arm 440 is urged upward because of the motion of the fluid "F", and the float 442 at the opposite end (440c in this case) of the arm is urged downward, the rod 444 will urge the slip pin 446 into motion. The slip pin 446 will then communicate with one of the discs 448. The disc 448 will then urge the tube 450 along that same path, urging the collective movement of the magnets 18 within the coils 20, thereby generating voltage or current within the coils 20 that may be immediately consumed or stored for later consumption. As the fluid "F" is displaced from one area of the enclosure to the adjacent area, the float 442 at end 440c will be urged upward and the float 442 at end 440b will be urged downward, and the rod 444 will move in the direction opposite to its previous motion, urging a disc 448 in the same direction and displacing the tube 450 along the same path in the opposing direction so that the magnets 18 and coils 20 communicate and generate voltage or current within the coils 20.

General Embodiment F

Figure 15:
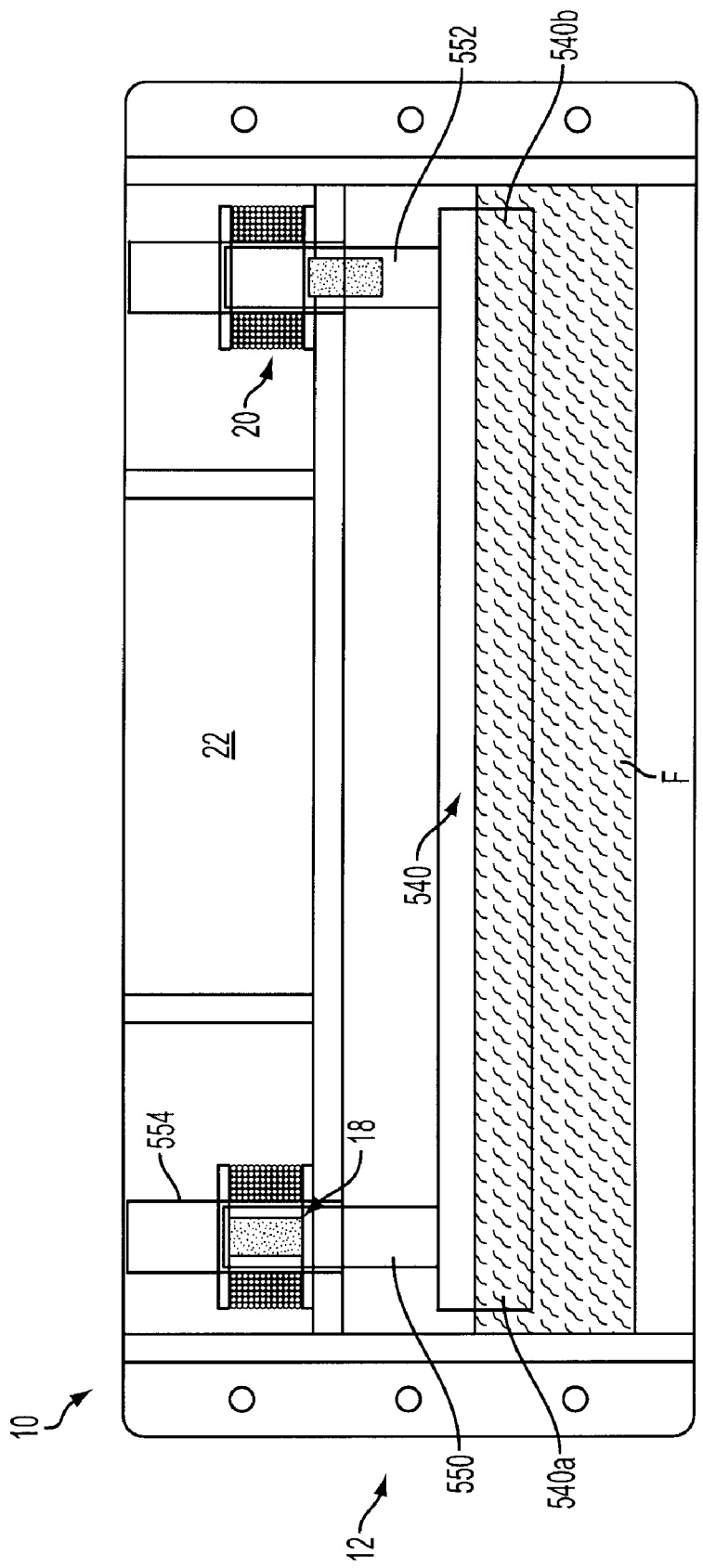
FIG. 15 is a front view of an alternate embodiment of FIG. 14, the generator having an arm communicating with a pair of tubes upstanding from the arm, the tubes communicating and engaging the coils positioned at the top of the enclosure and aligned with the tubes.

Referring now to FIG. 15, a generator 10 having an alternate configuration is disclosed in accordance with another embodiment of the present invention, the generator 10 utilizing fluid as a medium for effecting movement of a magnet(s) 18 through a coil(s) 20 as described above. The generator 10 has an enclosure 12 housing an arm 540 that floats and is buoyed by the fluid "F", and further comprising a compartment 22 for housing electronic components and battery(ies). The arm 540 communicates with a pair of tubes 550 and 552 aligned with the opposing ends 540a and 540b of the arm 540, the tubes 550 and 552 upstanding from the top of the arm 540 surface and extending toward the coil(s) 20 positioned at the top of the enclosure 12. Each tube 550 and 552 houses a magnet 18 and communicates with a corresponding coil 20 to generate voltage or current. Each coil 20 has an elongated opening or bore 554 through which each tube 550 and 552 communicates, thereby allowing each magnet 18 to come into adjacent relationship with each coil 20.

As motion from the vehicle is imparted on the fluid "F" within the enclosure 12, a wave is generated, urging one end 540a or 540b of the arm 540 upward, and thereby urging one of the tubes 550 or 552 upward, thereby urging the magnet 18 into communication with the coil 20 and generating a voltage or current. As the fluid "F" is displaced from one area of the enclosure to the adjacent area, the end 540a or 540b that was previously downward will be urged upward and the end 540a or 540b will be urged downward, and the corresponding tubes 550 and 552 will move accordingly so that the magnet 18 therein will communicate and engage the corresponding coil 20 and generate voltage or current within the coils 20.

General Embodiment G

Figure 16:
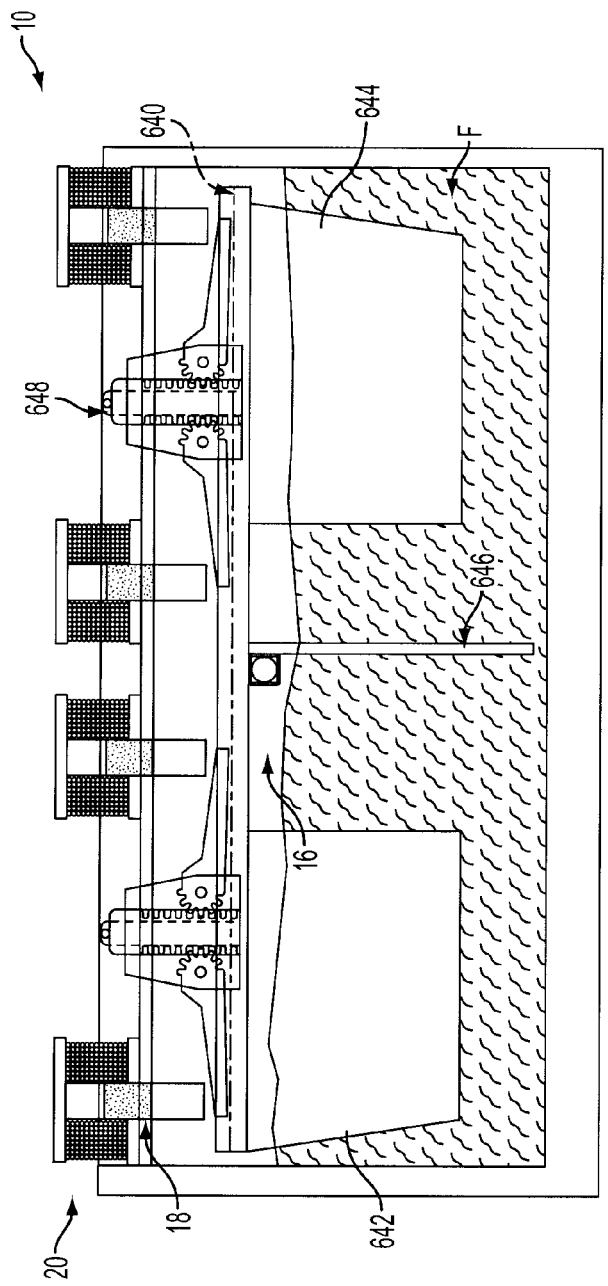
FIG. 16 is a front view of an alternate embodiment of FIG. 14 and FIG. 15, the generator having an arm with floats and a gear rack and lever arm for urging the magnet(s) through the coil(s)
Figure 17:
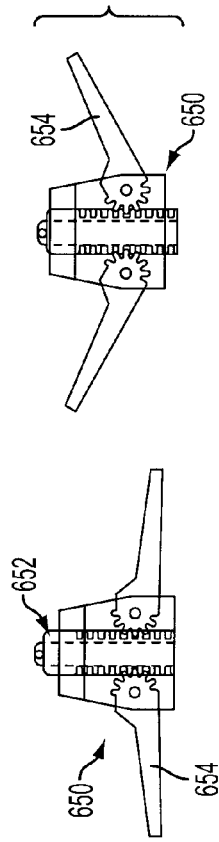
FIG. 17 is a front view of the gear rack and lever arm assembly.

Referring now to FIG. 16 and FIG. 17, a generator 10 having an alternate configuration is disclosed in accordance with another embodiment of the present invention, the generator 10 utilizing fluid as a medium for effecting movement of a magnet(s) 18 through a coil(s) 20 as described above. The generator 10 has an enclosure 12 comprising an arm 640 having floats 642 and 644 formed at opposite ends thereof communicating and responding to the motion of the fluid "F" provided within the enclosure 12. The arm 640 is coupled within and to the enclosure via means 16, such as a bearing, which operates as a fulcrum about which the arm 640 may rock, pivot or articulate in response to movement of fluid "F". The arm 640 comprises upwardly depending push rod 648 which communicates with and engages a gear/lever assembly 650, urging the communication at least one magnet 18 with a coil 20. A paddle 646 downwardly depends from the arm 640 and communicates with the fluid "F". The paddle 646 moves in conjunction with the movement of the arm 640 and functions to whisk fluid "F" rapidly toward the area of reduced fluid "F" volume, thereby increasing the speed at which the floats 642 respond and the arm 640 rocks or pivots.

Each assembly 650 comprises a gear rack 652 and a pair of gear arms or wings 654 operatively coupled with the gear rack 652. The gear arms or wings 654 are operatively coupled to the gear rack 652 via teeth 656 that intermesh with the slots or grooves 658 formed along the external surface of the gear rack 652. As the fluid "F" motion urges the arm 640 downward at one end (and upward at the opposing end), the push rod 648 urges the gear rack 652 downward and results in the gear arms or wings 654 urging upward as the teeth 656 intermesh with the slots or grooves 658 in a climbing manner so that the gear arms or wings 654 rapidly move from a horizontal position toward a vertical position. Each gear arm or wing 654 corresponds to a power generating unit, which generally comprises a magnet 18 and a corresponding coil 20, so that as each gear arm or wing 654 rapidly rises, each corresponding magnet 18 is urged upward through the bore or opening within the coil 20, generating voltage or current. As the fluid "F" motion urges the arm 640 to rock or move in the opposite direction, the push rod 648 urges the gear rack 652 to return upward resulting in the gear arms or wings 654 falling toward the horizontal starting position.

General Embodiment H

Figure 18:
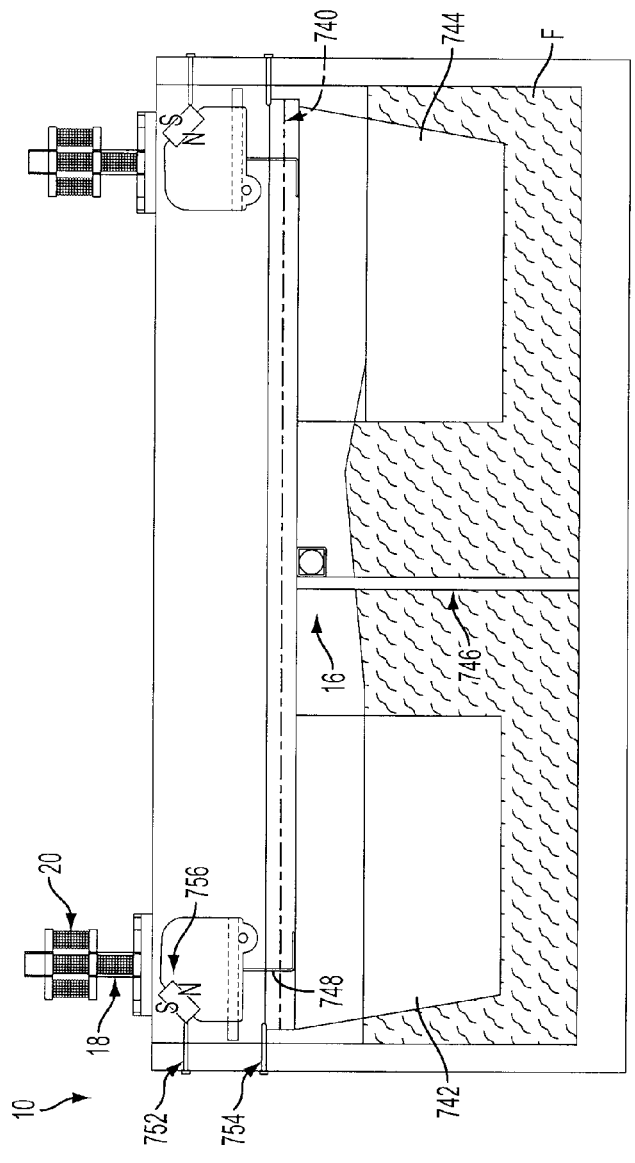
FIG. 18 is a front view of an alternate embodiment of FIG. 14, FIG. 15 and FIG. 16, the generator having an arm with floats, the arm urging a pair of cantilever modules that then urges the magnet(s) through the coil(s)
Figure 20:
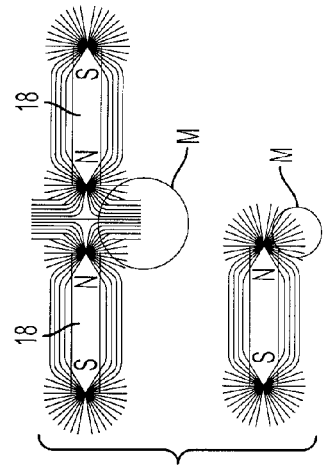
FIG. 20 is a top view of a single magnet and the magnetic lines of flux generally generated and a twin magnet orientation with like poles adjacently placed and the influence on the magnetic lines of flux, including an increase in the number and the angular orientation of the lines relative to the wires of the coil(s).
Figure 19:
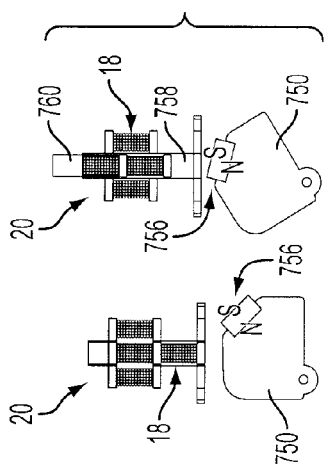
FIG. 19 is a front view of the cantilever modules communicating with the magnet(s) and coil(s)

Referring now to FIG. 18 through FIG. 20, a generator 10 having an alternate configuration is disclosed in accordance with another embodiment of the present invention, the generator 10 utilizing fluid as a medium for effecting movement of a magnet(s) 18 through a coil(s) 20 as described above. The generator 10 has an enclosure 12 comprising an arm 740 having floats 742 and 744 formed at opposite ends thereof communicating and responding to the motion of the fluid "F" provided within the enclosure 12. The arm 740 is coupled within and to the enclosure via means 16, such as a bearing, which operates as a fulcrum about which the arm 740 may rock, pivot or articulate in response to movement of fluid "F". A paddle 746 downwardly depends from the arm 740 and communicates with the fluid "F". The paddle 746 moves in conjunction with the movement of the arm 740 and functions to whisk fluid "F" rapidly toward the area of reduced fluid "F" volume, thereby increasing the speed at which the floats 742 respond and the arm 740 rocks or pivots. A pair of lifting plates 748 upwardly depend from the arm 740 and are oriented to communicate and engage a pair of cantilever modules 750 in a manner and for the function discussed below.

A pair of cantilever modules 750 are oriented so as to substantially align with the respective ends of arm 740, particularly communicating with and engaged by the lifting plates 748 upwardly depending from arm 740. As the arm 740 rocks or pivots in response to fluid "F" movement, one of the lifting plates 748 is urged upward (with the corresponding end of the arm 740) and strikes the base of one of the modules 750. The modules 750 are movable between an upper limit and a lower limit defined by stops 752 and 754, respectively. Each module 750 also comprises an external magnet 756 that communicates with a magnet 18 adjacent to the external magnet 756 (discussed in greater detail below). Superior and adjacent to each module 750 is a power generating unit generally comprising a pair of magnets 18 and a coil 20, the magnets 18 housed in a tube 758 that communicates and moves along an elongated opening or bore 760 within the coil 20.

In the power generating unit, the magnets 18 are oriented and configured head to tail with the south poles comprising the external margins and the north poles comprising the internal margins. The magnets 18 are physically and forcibly arranged so that there is some space between the margins of the north poles of each respective magnet 18, since this alignment generally creates repulsion forces. This arrangement positions the magnets 18 so that only the north poles of the magnets 18 engage the coil 20, and the south poles of the magnets 18 remain outside of the coil 20. It was observed that if the north and south poles of the magnets 18 are within the coil 20 at approximately the same time, the current created by the respective poles tends to cancel one another, thereby minimizing the effective current created. In arranging the magnets 18 in this manner, with some space between the respective north poles, the magnetic lines of flux M are concentrated and permit more lines of flux M to be oriented approximately 90 degrees to the wires of the coil 20, which then permits more electrical force to be created or generated as the magnet(s) 18 communicate and engage the coil(s) 20. The pair of magnets 18 are urged through the bore 760 of coil 20 via the repulsive forces generated between the south pole of the adjacent magnet 18 and south pole of the external magnet 756 on each module 750, resulting in magnetic levitation of the magnets 18. As the external magnet 756 is urged into a position adjacent the magnet 18, the south poles of each magnet 756 and 18 repel and urge the magnets 18 through the bore 760 and thereby communicating with the coil 20 to generate voltage or current.

The impact of the lifting plate 748 on the base of the module 750 has a resulting momentary impulse force that is greater than the lifting capacity of the arm 740, which causes the module 750 to rotate on its axis and urges the external magnet 756 into communication with the magnet 18. As noted above, the rotation of the module 750 results in the external magnet 756 (with the south pole externally oriented) communicating with and repelling the south pole of the adjacent magnet 18, urging the pair of magnets 18 upward through the bore 760 of the coil 20, generating voltage or current for immediate consumption or for storage. When the force of gravity overcomes the initial momentary impulse force, the module rotates about its axis and returns to an initial non-rotated state, thereby urging the magnet 756 away from magnet 18, thus removing the repulsion force and allowing the pair of magnets 18 to free-fall back to a resting state, resetting the position of the pair of magnets 18 for use in the next cycle. This process is repeated in quick succession and generates a steady current of electrical charge necessary to sustain the electrical life of the device(s) or system(s) coupled to the generator 10.

It is envisioned that the aforementioned embodiment may be altered so that means 16 is positioned at either terminal end of the arm 740, and that the module(s) 750 and corresponding power unit (magnet(s) and coil(s)) is positioned at an end opposite of the means 16 in such a configuration. It is also envisioned that at least one of the floats 742 or 744 is movable along the arm 740, so that as the arm 740 shifts, the float 742 or 744 will move or slide toward the lowered end of the arm 740 and approach the other float. As with all the embodiments, it is envisioned that the floats may be varied in size and in composition to accommodate any physical constraints required for an application.

The aforementioned embodiment addressed several concerns, including the need to minimize friction between the moving parts, which generally results in wasted or unharnessed energy, maximizing the magnetic lines of flux between adjacent magnets and coils, and increasing the speed at which the magnet(s) move through the coil(s). Utilizing the momentary impulse force also allows the generator 10 to lift an object that might otherwise require additional external force. The forcible orientation of the magnets 18 so that the north poles are adjacent (with a space therebetween) aligned the magnetic lines of flux approximately 90 degrees, thereby maximizing the voltage or current that might be generated once the magnet(s) 18 communicate and engage the coil(s) 20. Using magnetic levitation for urging the magnets 18 upward through the coils 20 results in a significant reduction in the power or energy lost to friction, and also takes advantage of a second momentary impulse force generated between the pole of the external magnet 756 and the pole of the adjacent magnet 18, thereby urging the magnets 18 rapidly upward through the coil 20 at a velocity significantly higher over standard mechanical forces.

It is envisioned that the various embodiments, as separately disclosed, are interchangeable in various aspects, so that elements of one embodiment may be incorporated into one or more of the other embodiments, including the application of fluid as a medium of motion transmission to those embodiments not specifically depicted as utilizing fluid. Likewise, it is equally envisioned that specific positioning of the various elements is variable as required and demanded because of performance requirements or spatial constructions.

It is to be understood that the embodiments and claims are not limited in its application to the details of construction and to the arrangement of the components set forth in the description or illustrated in the drawings. The embodiments and claims disclosed herein are further capable of other embodiments and of being practiced and carried out in various ways. Also, it is to be understood that the phraseology and terminology employed herein are for the purpose of description and should not be regarded as limiting the claims.

Accordingly, those skilled in the art will appreciate that the conception upon which this application is based may readily be utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The Abstract is neither intended to define the claims of the application, nor is it intended to be limiting to the scope of the claims in any way. It is intended that the application is defined by the claims.

What is claimed is:

1. A motion induced generator mounted to a conveyance, the generator comprising:
    an enclosure mounted to the conveyance, the enclosure having a volume of fluid therein;
    an arm housed within the enclosure, the arm moving in response to external motion generated by the conveyance applied to the enclosure and transmitted to the arm via the fluid;
    at least one magnet and at least one coil, the at least one magnet and at least one coil urged into communication with one another via the motion of the arm, thereby generating current;
    a rectifying circuit operatively coupled to the at least one coil, the circuit converting the alternating current to direct current for use or storage;
    at least one float, wherein the at least one float depends from one end of the arm, and the at least one float is partially submerged within the fluid and imparts movement of the arm in response to movement of the fluid therein; and
    a push rod operatively coupled with a gear and lever assembly having a pair of wings, wherein as the arm rocks downward the push rod follows and raises the wings upward, thereby urging communication of the magnet and coil thereby generating current.

2. The generator of claim 1, wherein the rectifying circuit is operatively coupled to an electrical device.

3. The generator of claim 1, wherein the rectifying circuit is operatively coupled to an energy storage device.

4. The generator of claim 1 further comprising a rod depending from the arm and mutually coupled to a movable tube communicating with the magnets and coils.

5. The generator of claim 1 further comprising at least one cantilever module.

6. The generator of claim 5, wherein the at least one cantilever module is aligned with one end of the arm engaged by a lifting plate upwardly depending from the arm, the at least one cantilever module having an external magnet communicating with an adjacent magnet, wherein communication of the external magnet with the adjacent magnet urges communication of the adjacent magnet and an adjacent coil, thereby generating current.

7. The generator of claim 1, wherein the arm is partially submerged within the fluid and imparts movement on a pair of tubes communicating with the magnets and coils, wherein movement of the arm generates reciprocating movement of the tubes and generates current.

8. A motion induced generator mounted to a conveyance, the generator comprising:
    an enclosure mounted to the conveyance, the enclosure having a volume of fluid therein;
    an arm housed within the enclosure, the arm moving in response to external motion generated by the conveyance applied to the enclosure and transmitted to the arm via the fluid;
    at least one magnet and at least one coil, the at least one magnet and at least one coil urged into communication with one another via the motion of the arm, thereby generating current;
    a rectifying circuit operatively coupled to the at least one coil, the circuit converting the alternating current to direct current for use or storage, the circuit operatively coupled with at least one electrical device;
    at least one float, wherein the at least one float depends from one end of the arm, and the at least one float is partially submerged within the fluid and imparts movement of the arm in response to movement of the fluid therein; and
    a push rod operatively coupled with a gear and lever assembly having a pair of wings, wherein as the arm rocks downward the push rod follows and raises the wings upward, thereby urging communication of the magnet and coil thereby generating current.

9. The generator of claim 8, wherein the at least one electrical device comprises a light emitting device.

10. The generator of claim 9, wherein the light emitting device is a member selected from the group consisting of an incandescent bulb, a light emitting ceramic device, a light emitting diode, a liquid crystal display and a fluorescent bulb.

11. The generator of claim 8, wherein the at least one electrical device comprises a diagnostic device.

12. The generator of claim 8, wherein the at least one electrical device comprises a positioning system.

13. The generator of claim 12 further comprising a tracking system.

14. A motion induced generator mounted to at least one rail car, the generator comprising:
    an enclosure mounted to the at least one rail car, the enclosure having a volume of fluid therein;
    an arm housed within the enclosure, the arm moving in response to external motion generated by the at least one rail car applied to the enclosure and transmitted to the arm via the fluid;
    at least one magnet and at least one coil, the at least one magnet and at least one coil urged into communication with one another via the motion of the arm, thereby generating current;
    a rectifying circuit operatively coupled to the at least one coil, the circuit converting the alternating current to direct current for use or storage, the circuit operatively coupled with at least one electrical device;
    at least one float, wherein the at least one float depends from one end of the arm, and the at least one float is partially submerged within the fluid and imparts movement of the arm in response to movement of the fluid therein; and
    a push rod operatively coupled with a gear and lever assembly having a pair of wings, wherein as the arm rocks downward the push rod follows and raises the wings upward, thereby urging communication of the magnet and coil thereby generating current.

15. The generator of claim 14, wherein the at least one electrical device comprises a light emitting device.

16. The generator of claim 15, wherein the light emitting device is a member selected from the group consisting of an incandescent bulb, a light emitting ceramic device, a light emitting diode, a liquid crystal display and a fluorescent bulb.

17. The generator of claim 14, wherein the at least one electrical device comprises a diagnostic device.

18. The generator of claim 14, wherein the at least one electrical device comprises a positioning system.

19. The generator of claim 18 further comprising a tracking system.

* * * * *